J. HEINRICHS.
DRINK SHAKER.
APPLICATION FILED AUG. 10, 1908.
950,288.
Patented Feb. 22, 1910.
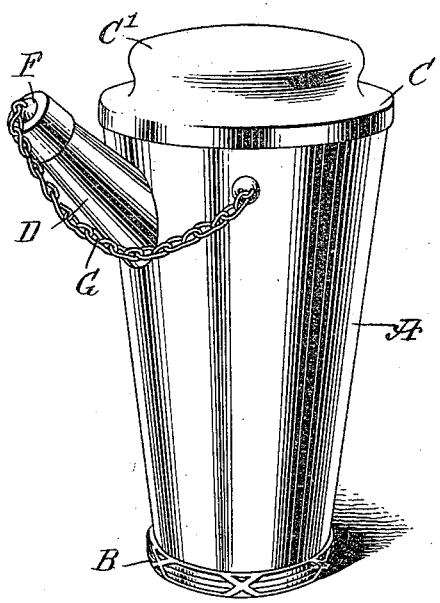
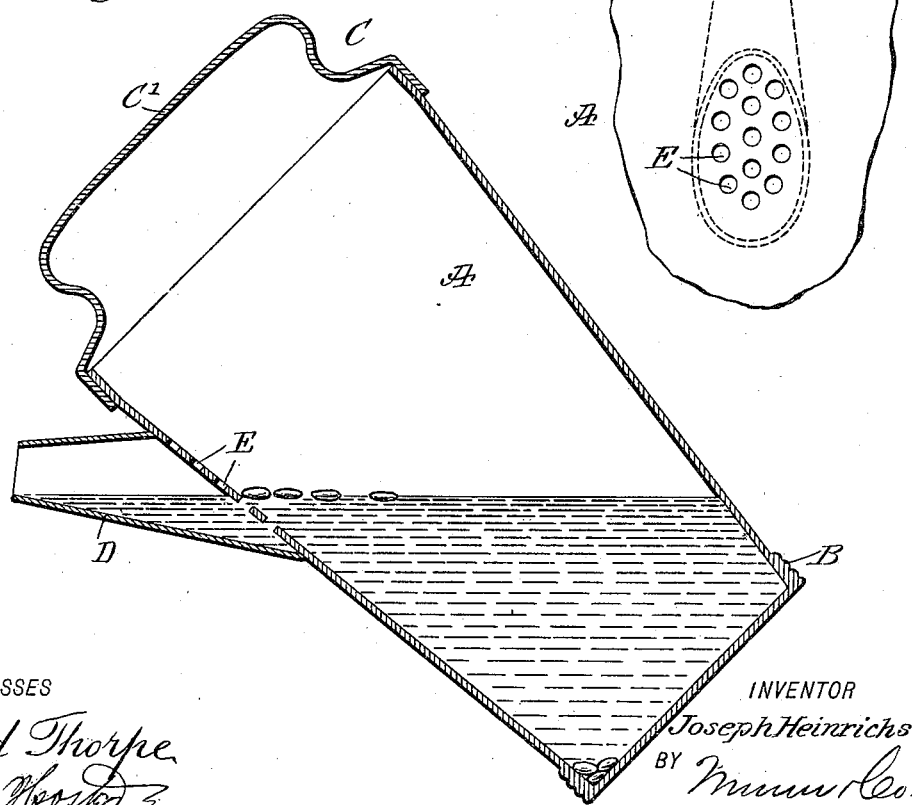
WITNESSES
Edward Thorpe
INVENTOR
Joseph Heinrichs
BY
ATTORNEYS

UNITED STATES PATENT OFFICE.

JOSEPH HEINRICHS, OF NEW YORK, N. Y.

DRINK-SHAKER.

950,288. Specification of Letters Patent. Patented Feb. 22, 1910.

Application filed August 10, 1908. Serial No. 447,744.

*To all whom it may concern:*

Be it known that I, JOSEPH HEINRICHS, a citizen of the United States, and a resident of the city of New York, borough of Manhattan, in the county and State of New York, have invented a new and Improved Drink-Shaker, of which the following is a full, clear, and exact description.

The invention relates to drink mixers, and its object is to provide a new and improved drink shaker, more especially designed for use in making cocktails, milk punches and like drinks, and arranged to allow convenient mixing and cooling of the ingredients and straining and pouring of the drink into a glass.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1 is a perspective view of the improvement; Fig. 2 is a sectional side elevation of the same in pouring position; and Fig. 3 is a cross section of the improvement, showing more particularly the integral strainer formed in the wall of the body of the vessel.

The body A of a vessel of inverted frusto-conical shape is provided at its bottom with an outwardly-extending flange B, forming a convenient hand-hold for the operator to take hold of with one hand when shaking the vessel, as hereinafter more fully explained. The open top or enlarged end of the body A is adapted to be closed by a cover C fitting exteriorly onto the wall of the body A, at the upper end thereof, and the said cover C is provided on top with a handle C', adapted to be taken hold of by the operator with the other hand, so that the operator is enabled to conveniently shake the vessel for mixing the ingredients of the drink contained in the body A of the vessel. The wall of the body A is provided near its upper end with a perforated portion E, forming a strainer opening into a spout D secured to the outside of the body A and extending upwardly and outwardly therefrom, as plainly indicated in Figs. 1 and 2. The end of the spout D is adapted to be closed by a cap F held on one end of a small chain G secured to the body A adjacent to the spout D.

The drink shaker is used as follows: The cap F is placed in position on the spout D, to close the same, and the cover C is removed to permit of placing the ingredients for the drink and the crushed ice for cooling in the body A, after which the cover C is placed in position on the open end of the body A. The operator now takes hold with one hand of the flange B and with the other hand of the handle C' and then shakes the vessel, so as to cause a thorough mixing of the ingredients and contact of the same with the ice, to cool the drink. When the drink has been formed, the operator removes the cap F and then tilts the vessel so that the drink passes through the perforations E into the spout D and out of the same into a glass to be filled.

From the foregoing, it will be seen that by the arrangement described a separate glass, such as is usually used, and inserted in an ordinary drink shaker, is entirely dispensed with, and the separate strainer heretofore used and placed in the open end of the body A is also dispensed with.

By the arrangement described, the vessel can be properly shaken, to thoroughly mix the ingredients of the drink, and to allow convenient pouring of the mixed drink into a glass, without danger of spilling or without lumpy matter passing into the glass. By having the cap F permanently attached to the body A by the use of the chain G, it is evident that the cap cannot get lost and is within easy reach of the operator for closing the spout D.

Having thus described my invention, I claim as new and desire to secure by Letters Patent:

A drink shaker comprising an inverted frusto conical body having an open top, and having its bottom provided with an integral annular flange for the purpose specified, a detached cover for closing the open end, said cover having an integral annular bead forming a hand hold, said body having a spout extending upwardly and outwardly therefrom, and having a plurality of perforations at the inner end of the spout to form a strainer, a cap for closing the spout, and a flexible connection between the cap and the body.

In testimony whereof I have signed my name to this specification in the presence of two subscribing witnesses.

JOSEPH HEINRICHS.

Witnesses:
EVERARD B. MARSHALL,
PHILIP D. ROLLHAUS.